United States Patent [19]

Gall et al.

[11] 4,406,411

[45] Sep. 27, 1983

[54] RECLAMATION AND REJUVENATION OF PLASTIC AND METAL FROM METALLIZED PLASTIC

[75] Inventors: Richard L. Gall, Dexter; Richard T. Anklin, Tecumseh; William B. Mende, Clinton, all of Mich.

[73] Assignee: Ford Motor Company, Dearborn, Mich.

[21] Appl. No.: 145,274

[22] Filed: Apr. 30, 1980

Related U.S. Application Data

[63] Continuation-in-part of Ser. No. 73,768, Sep. 10, 1979, abandoned, and Ser. No. 968,943, Dec. 13, 1978, abandoned, said Ser. No. 73,768, is a continuation-in-part of Ser. No. 968,943.

[51] Int. Cl.$^3$ ............................................. B02C 21/00
[52] U.S. Cl. ................................... 428/577; 29/403.3; 241/23; 241/24; 241/14; 241/DIG. 37; 428/903.3; 428/542.8
[58] Field of Search ................... 241/3, 14, 23, 24, 68, 241/79, 101.4, DIG. 37; 260/2.3; 264/22, 28, 37, 138, 140, 176 R

[56] References Cited

U.S. PATENT DOCUMENTS

| | | | |
|---|---|---|---|
| 2,879,005 | 3/1959 | Jarvis | 241/14 |
| 2,971,703 | 2/1961 | Rath | 241/24 |
| 3,749,322 | 7/1973 | Reynolds | 241/24 |
| 3,885,744 | 5/1975 | Drage | 241/23 |
| 3,973,736 | 8/1976 | Nilsson | 241/DIG. 38 |
| 4,025,990 | 5/1977 | Louette | 241/DIG. 37 |
| 4,113,185 | 9/1978 | Marsh et al. | 241/24 X |
| 4,251,034 | 2/1981 | Corr et al. | 241/DIG. 37 |

FOREIGN PATENT DOCUMENTS

2208926 9/1973 Fed. Rep. of Germany .
2131374 11/1972 France .

*Primary Examiner*—Mark Rosenbaum
*Attorney, Agent, or Firm*—Peter D. McDermott; Roger L. May

[57] ABSTRACT

Metallized plastic such as chrome plated plastic is processed to separate metal from plastic and especially to recover reusable, essentially metal-free plastic. Metallized plastic is comminuted, as necessary, to suitably sized pieces which then are exposed to cryogenic temperature and impacted in a rotary mill to form a mixture of plastic and metal particles. Subsequently most of the metal particles are removed from the mixture by effecting particle size and magnetic separation steps. Oversized particles can be recycled for further processing. The recovered plastic is then extruded, under conditions which render it molten, through one or more screens.

56 Claims, 6 Drawing Figures

RECLAMATION AND REJUVENATION OF PLASTIC AND METAL FROM METALLIZED PLASTIC

BACKGROUND OF THE INVENTION

This application is a continuation-in-part of U.S. Ser. No. 968,943 now abandoned filed Dec. 13, 1978 and U.S. Ser. No. 73,768 now abandoned filed Sept. 10, 1979, which is also a continuation-in-part of U.S. Ser. No. 968,943.

Reclamation of materials from spent or otherwise normally discarded articles has obvious potential for financial as well as environmental benefit. Reclamation of plastic or metal from articles consisting of metal or plastic alone may not require a specialized approach. On the other hand, reclamation of metal, plastic or both from articles comprising intimately combined metal and plastic presents liberation and separation considerations. Several approaches have been proposed. See, for example, U.S. Pat. Nos. 4,025,990; 4,020,992; 3,995,816; 3,990,641; 3,718,284; 3,666,185; 3,643,873; 3,527,414; 2,879,005; and 1,978,204.

Generally, however, recovery of metallized plastic, such as chrome plated plastic, has not received, as far as known, particular attention. For example, the above patents typically provide recovery processes for scrap or other normally discarded articles in which there is "embedded or occluded" metal (e.g. U.S. Pat. No. 2,879,005), or in which the metal is not expected to tenaciously adhere to the plastic (e.g. U.S. Pat. No. 4,020,992, bottle caps). (See, also, U.S. Pat. Nos. 1,978,204; 3,718,284; 3,995,816; and 4,925,990 which show tire recovery; and U.S. Pat. Nos. 3,527,414 and 3,990,641 which show wire recovery.) Moreover, in other instances focus is primarily on recovery of metal, e.g. U.S. Pat. Nos. 3,885,744 and 3,443,873.

Reclamation of plastic from metallized plastic presents especially difficult liberation as well as separation problems. For example, metallized plastic is designed to resist breaking away of metal from plastic. To this end, prior to metallization such as plating, the plastic may be etched, abraded or otherwise treated to adhere tenaciously metal to plastic.

Even after liberation of metal from plastic, however, separation can be further complicated by additional aspects of certain metallized plastic. For example, the metal may comprise non-ferrous or essentially non-ferrous metal and even contain non- or substantially non-ferromagnetic metal (e.g. copper) layers. Still further, even low levels of minute particles can render reclaimed plastic unacceptable for return to higher uses, e.g., plating grade thermoplastic. Still other difficulties (e.g. handling of dust generation) that have been overcome in provision of the industrially suitable and economically valuable process of this invention will be more apparent from the following disclosure.

It is an object of this invention to reclaim and rejuvenate plastic from metallized plastic.

BRIEF DESCRIPTION OF THE INVENTION

This invention relates particularly to reclamation of plastic, especially thermoplastic polymer, from metallized plastic. In a preferred embodiment, this invention permits rejuvenation (i.e., return to functionally original state) of plastic from metallized plastic such as chrome plated plastic.

This invention includes use of special comminution and metallic particle separation steps. More particularly, by certain cryogenic comminution of prepared metallized pieces, there is a liberation of metal from enough plastic to permit economically effective withdrawal (preferably by steps comprising certain magnetic and particle separations) of nearly all of the metal therefrom. This withdrawal of metal occurs even though the metal may be essentially non-ferrous and may include non-ferromagnetic metal (e.g. copper) layers. Preferably, a purification step (e.g., filtration of molten polymer) provides plastic that may be reused again in metallizing operations. Alternatively, a non-magnetic fraction obtained by magnetic separation after cryogenic comminution may be used for general purpose application.

The liberation of metal from metallized plastic that permits efficient metal separation in accordance with the invention occurs optimally under special conditions. More particularly, there is first an exposure of metallized plastic pieces of desirably certain size to a temperature sufficiently below the glass transition temperature of the plastic to maintain its brittleness during milling. Additionally, this exposure differentially shrinks metal and plastic. Impact of the cooled pieces in a mill then shatters them, pulverizes the plastic, and thereby liberates plastic from metal.

It has been found that this cryogenic comminution and consequent liberation of metal from plastic has an optimal occurrence when impact of the cooled metallized pieces is against intermeshing impact pegs in a centrifugal rotary impact mill operating at high speeds. More particularly and preferably, the intermeshing impacting pegs are rectilinear and arranged so as to receive a substantial portion of the pieces at least initially at an angle that deflects them at other pegs. Thus, as the pieces fly out from the center of the rotary impact mill, they contact a plurality of impact pegs, are shattered and the plastic is pulverized. The metal then exists as at least substantially metal particles dispersed in plastic powder.

Nearly all of the metal can then be removed from the pulverized plastic by withdrawal of the at least substantially metal particles therefrom using certain techniques. Preferably, magnetic and particle size separations accomplish this withdrawal. Recycle of larger particles that are obtained by particle size separation enables further pulverization and consequent liberation of plastic and metal. Advantageously, the amount of particles thus recycled for further pulverization can be as low as 10% (or even less) by weight of the particles subjected to particle size separation.

In one embodiment, this invention relates to a method of separation of inorganic and organic solids wherein the inorganic solid comprises metal and the organic solid comprises thermoplastic polymer and which method includes comminuting conjoined pieces of the solids under cryogenic conditions and providing magnetically separated fractions thereof. More particularly this embodiment relates to an improvement which permits rejuvenation of thermoplastic polymer from scrap having tenaciously adhering plating comprising magnetically susceptible but substantially non-ferrous metal laminates. This improved method comprises (A) introducing scrap pieces that have a weight average average between largest and smallest particle dimensions between about 1–20 (more preferably, between about 3–12) millimeters and have been exposed to a temperature sufficiently below the glass transition temperature to maintain brittleness of the plastic during milling (e.g., below about −87° C., more preferably below about −110° C., such as −125° C.) into a high speed, rotary impact mill that pulverizes the scrap pieces into a powder at least about 80% by weight of which has a weight average average between smallest and largest particle dimensions that is at least about 10 times smaller than the corresponding average of the scrap pieces, and (B) retrieving thermoplastic polymer as a non-magnetic fraction of the powder from one or more magnetic separations wherein at least one of the magnetic separation comprises exposing at least a portion of the powder which comprises at least most by weight of its smallest particles through a high intensity magnetic field that leaves less than about 1% by weight metal in the thermoplastic polymer that is collected. The "scrap pieces" above are typically pieces of scrap ground in conventional grinding equipment. This embodiment includes a method for rejuvenating thermoplastic polymer comprising ABS from plated pieces thereof wherein the plating consists essentially of non-ferrous laminates of nickel, copper and chromium and comprises: (A) grinding pieces of the scrap to a weight average average between largest and smallest particle dimension of between about 6–12 millimeters and exposing these particles to a first magnetic separation; (B) exposing the ground and non-magnetically separated particles to such above described temperature, e.g. below about −157° C.; (C) impacting the cooled particles in a centrifugal rotary impact mill to yield a powder at least about 90% by weight of which passes through an 18 mesh screen; (D) exposing at least a portion of the smallest particles of the powder to at least two magnetic separations including a magnetic separation that exposes the powder to a high intensity magnetic field; (E) extruding the magnetically separated powder in molten form through one or more screens to yield a plating grade thermoplastic polymer.

As will be recognized by those in the art, weight average average between largest and smallest particle dimensions may be determined using Formula I, below:

$$\frac{\sum_{i=1}^{\eta} W_i A_i}{\sum_{i=1}^{\eta} W_i} \quad \text{Formula I}$$

where $W_i$ is the weight of particle i, $A_i$ is $(L_i + S_i)/2$ where $L_i$ and $S_i$ are largest and smallest particle dimensions of particle i, respectively, and is the number of particles.

With respect to spherical or substantially spherical particles, the average between largest and smallest particle dimensions is the diameter of the particle or approximately the diameter of a hypothetical sphere which has the volume of the substantially spherical particle. For purposes of this invention, a group of particles may be assumed generally to be spherical or substantially spherical.

An expedient approximation of weight average average between largest and smallest particle dimensions of a group of spherical or substantially spherical particles is by sieve analysis. In this analysis the group of particles is dropped through a series of sieves with decreasing size openings. With this analysis, $W_i$ becomes the weight fraction (weight over total weight of particles) caught at each sieve level and $A_i$ becomes the average of the cross sections of the openings of the upper sieve through which the weight fraction $W_i$ passed and the lower sieve through which the weight fraction $W_i$ did not pass. The various $W_i$ and $A_i$ determinations so made are then used with Formula I to calculate a weight average average between largest and smallest particle dimensions for the group of particles. Alternatively, by sieve analysis it can be determined through what sieve size 50% by weight of the particles would pass and 50% by weight of the particles would not pass. This sieve opening may be related to weight average by standard calculation techniques i.e. mean is related to weight average by standard formula. See ASTMD-452-63 Volumes 10 and 11.

For a group of particles, however, in which two dimensions of substantially all the particles exceed a third dimension, i.e. particles that are platelets where the thickness is less than about 10 times either of the other dimensions, the sieve analysis as above provides a determined weight average average between largest and smallest particle dimensions that is larger than the actual weight average average particle dimensions by a factor slightly less than two. Accordingly, such determined average is to be divided by two to give the weight average average of Formula I. Similarly, for a group of particles in which one dimension substantially exceeds the other two dimensions, e.g. needle shaped particles in which the long dimension exceeds the shortest dimension by a factor or 10 or more, the weight average between largest and smallest particle dimensions determined by sieve analysis above will be slightly larger than the actual weight average average between largest and smallest particle dimensions by slightly less than two, although closer to the actual weight average average particle dimensions than in the case of platelets. This is because some needle-like particles may pass through screen openings smaller than their largest dimension.

In still other measurements in which a group of particles have predominantly by weight particles in which one dimension greatly exceeds the smaller dimension, samples of the group of particles may be taken and individual particles analyzed for $W_i$ and $A_i$. The determined $W_i$ and $A_i$ for each particle may then be plugged into Formula I to determine weight average average between largest and smallest particle dimensions. This technique, though tedious, could be used to measure weight average average between largest and smallest particles dimensions for groups of particles of virtually any dimension.

BRIEF DESCRIPTION OF THE DRAWING

FIGS. 2, 3, 4, 5 and 6 illustrate graphically particle size distributions from various stages of a preferred embodiment set forth in Example 1.

DETAILED DESCRIPTION OF THE INVENTION

This invention permits reclamation of plastic from metallized plastic even when the metal is essentially non-ferrous and even though it may comprise non-ferromagnetic metal (e.g. copper).

The process of this invention as hereinafter described is especially suitable for reclamation and rejuvenation of theremoplastic polymer. For example, ABS (acrylonitrile-butadiene-styrene polymer) may be reclaimed or rejuvenated from metallized, e.g. plated ABS. Other thermoplastic polymers also can be reclaimed or rejuvenated. Examples of such polymers include aryl polymers, such as polyphenyleneoxide and polyolefins, such as polypropylene. Further the thermoplastic polymers may be polymer blends as well as blends with inorganic modifiers, e.g., fillers such as calcium carbonate. Other plastics that are crosslinked in varying degrees and metallized also may be substantially separated from metal in accordance with the invention. Moreover, this invention permits reclamation of metal by product that can provide further economic benefit.

This invention is especially suitable for reclamation and rejuvenation of metallized plastic wherein the coating on the plastic comprises chrome plate. As is known, such chrome plate may, for example, comprise one or more layers of nickel and copper with a final relatively thin layer of chromium.

Plated ABS, for example, is used commercially as automotive plastic in decorative moldings, e.g. grills, headlight housings, trim strips and the like. These plated plastics may comprise nickel, copper and chromium wherein the nickel and copper are at about equal by weight and the chromium comprises much less. Thus, for example, in aqueous plating a typical plating grade ABS molded object may be first etched (high or low chromic acid). Thereafter, it is plated to provide a coating with, for example, metal thicknesses ranging about: strike nickel (0.2-5 tenths of a mil), copper (1-10 tenths of a mil), semi bright nickel (1-10 tenths of a mil), bright nickel (0.5-10 tenths of a mil), and chromium (0.2-5 hundredths of a mil). Moreover, other variations are well known, e.g., use of strike copper rather than strike nickel as well as use of bronzes. Plating to plastic ratios may vary widely but normally comprise between about 1-25 parts by weight metal per hundred parts by weight plastic.

Figure 1:
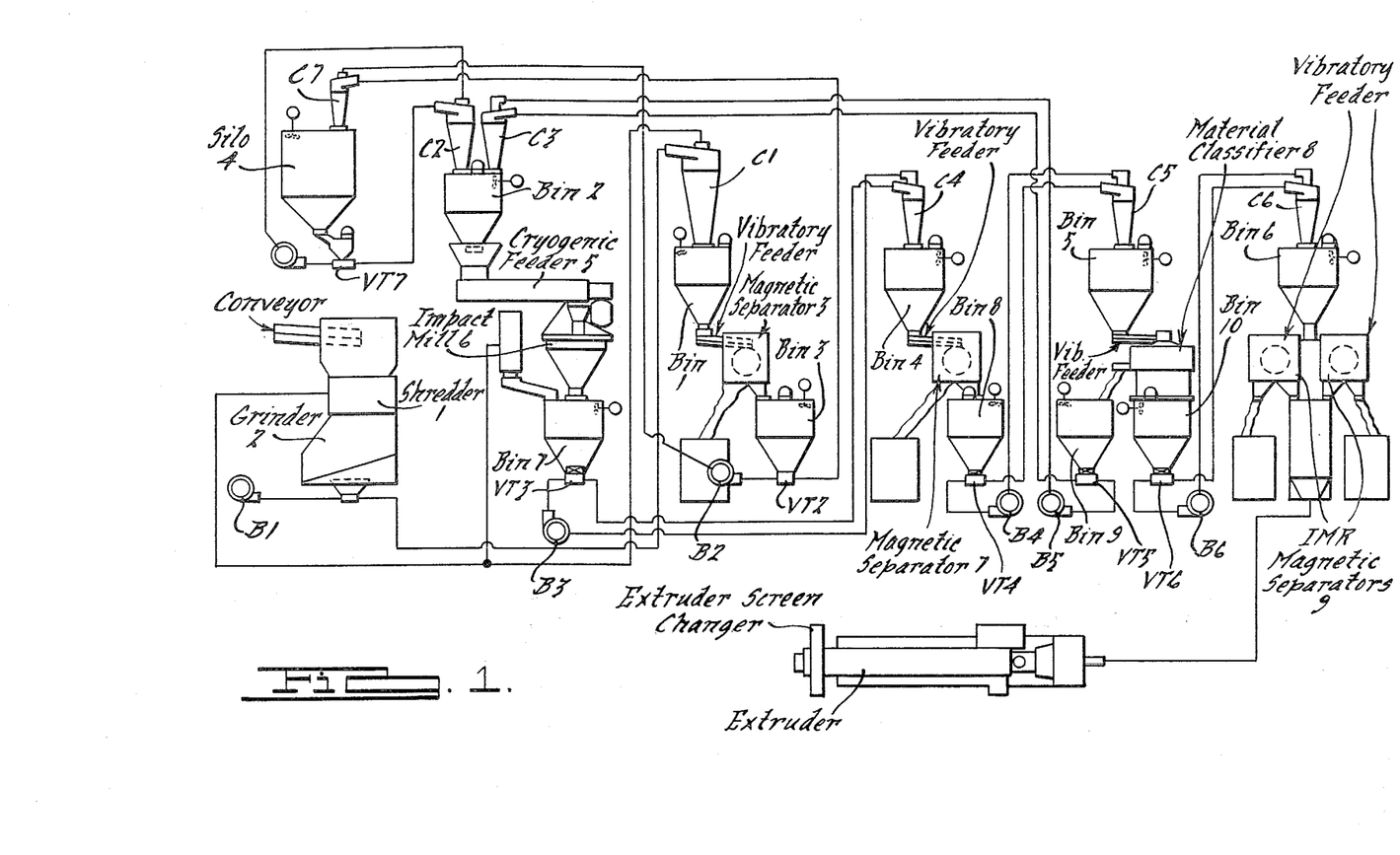
FIG. 1 illustrates schematically a preferred processing sequence including equipment therefore in which rejuvenation of plastic from large size metallized scrap, e.g. automotive grills, occurs.

Referring to FIG. 1, there is shown a preferred embodiment of this invention. It is generally closed system for reclamation and rejuvenation of thermoplastic polymer from large size plated scrap, e.g. automotive grills and headlamp housings. The system is equipped with solenoid valves for control of material flow through pneumatic lines from one stage to another. The material bins are equipped with level detectors. The pneumatic feed lines are equipped with blowers (B1-B7), venturi loaders (VT1-VT7) and cyclones (C1-C7) that aid in efficient material flow.

In a preparatory stage workpieces to be processed in accordance with this system are conveyed as in the drawing to Shredder 1/Grinder 2 that comminutes them into pieces suitable for cryogenic grinding. Shredder 1 is particularly advantageous to shred large articles of scrap such as grills so as to reduce wear on Grinder 2. The ground pieces obtained from Grinder 2 preferably are such that at least about 80% by weight (absent flaked off metal) pass through a sieve having an opening of about 25 millimeters. Even more preferably at least about 80% by weight should pass through a sieve having an opening of about 10 millimeters. Larger ground pieces e.g. those retained on sieves with openings about 15 millimeters, may require more recycling due to insufficient pulverization during cryogenic comminution.

The need for recycling is dependent upon factors such as cooling rate, other dimensions of pieces, amount of metal coating relative to plastic, nature of plastic and metal, impact mill design and peg dimensions and distribution, etc.

For chrome plated thermoplastic in which the plastic comprises, for example, ABS and the metal comprises layered nickel, copper, and chrome, the scrap is preferably ground or otherwise prepared so that at least about 50% by weight of the pieces (absent flaked off metal) passes through a mesh having an opening of about 10 (more preferably 5) millimeters. Preferably, at least about 80% by weight additionally passes through a mesh about 15 millimeters.

From the Shredder 1/Grinder 2, the ground pieces are preferably subjected to a magnetic separation. To this end, they are pneumatically conveyed preferably first to a vibratory feeder for Magnetic Separator 3. Magnetic Separator 3 is a permanent drum magnet and, advantageously, removes magnetically susceptible metal that may be flaked off during the grinding operation. It is desirable, however, that the Magnetic Separator 3 be controlled to remove only highly magnetically susceptible material to avoid excessive processing losses of plastic. This is accomplished, for example, by wrapping the drum with rubber coating of preferably less than about 2.5 cm thick, e.g. 0.65 cm. The drum speed is preferably about 20-60 such as about 40 rpm. The magnetic portion from Magnetic Separator 3 may further be reprocessed, if desired, but comprises nearly all metal.

The non-magnetic effluent of Magnetic Separator 3 is then preferably pneumatically conveyed to Silo 4 for storage and to permit regulation of material flow through the rest of the process.

From Silo 4, pieces of metallized plastic (i.e., pieces remaining after grinding and magnetic withdrawal of metal by Magnetic Separator 3) are pneumatically conveyed to Cryogenic Feeder 5. Cryogenic Feeder 5 permits their contact with a temperature substantially below the glass transition temperature of the plastic. The precise temperature chosen will vary depending on factors such as thickness and type of thermoplastic; thickness and type of metal; impact mill design and speed; and economics chosen, e.g. amount of recycle of insufficiently pulverized pieces tolerated. The cooling is readily accomplished by conventional means, e.g. by exposure to liquid nitrogen or other fluid cryogenic substance.

Advantageously, the cryogenic fluid may be conserved by intermittant introduction into the Cryogenic Feeder 5. Thus, a temperature sensor in Cryogenic Feeder 5 may be used to activate solenoids that admit, for example, liquid nitrogen to maintain desired temperature range.

Normally, the amount of liquid nitrogen or other cryogenic fluid used is by weight well below about 2 times the amount of pieces processed, preferably below about equal parts by weight. By intermittant introduction of liquid nitrogen or other such fluid into Cryogenic Feeder 5, with appropriate temperature sensing feedback, a steady state amount of nitrogen may be as low as about 0.2 times by weight the amount of pieces being processed at desirable feed rates, e.g. 500 kg/hr or more. A typical range is between about 0.2-0.6 nitrogen parts per one part metallized plastic pieces by weight. The amount used varies to some extent, for example, on feed rate of metallized pieces, on ambient climatic conditions and on length of equipment operation.

Pieces of metallized plastic (which preferably have been previously ground and subjected to magnetic separation as indicated above) are desirably augered through Cryogenic Feeder 5 by a screw that has cutout flights to promote contact with the cryogenic fluid.

The cryogenic fluid, as mentioned, cools the pieces of metallized plastic as they pass through Cryogenic Feeder 5 into Impact Mill 6. When temperature sensors within Cryogenic Feeder 5 report temperature elevation above a certain level, (e.g. −150° F.) solenoid valves open and admit cryogenic fluid, preferably liquid nitrogen, into Cryogenic Feeder 5.

At least one solenoid preferably permits admission of liquid nitrogen at the end of Cryogenic Feeder 5 nearest Impact Mill 6. Another solenoid preferably permits admission of liquid nitrogen into the closed chute between Cryogenic Feeder 5 and Impact Mill 6. Thus, the cryogenic fluid travels with the cooled pieces of metallized plastic into Impact Mill 6. This cryogenic fluid cools Impact Mill 6 during operation.

When liquid nitrogen is employed as the cryogenic fluid, its temperature (in the liquid state) ranges at most up to about −120° F. Accordingly, it vaporizes upon contact with warmer surfaces within Cryogenic Feeder 5, Impact Mill 6 and the chute therebetween. Flow of the pieces of metallized plastic along with rotation of Impact Mill 6 draws the vapor through Impact Mill 6 and into Bin 7.

Venting of Bin 7 relieves pressure of the expanding vapor passing through Impact Mill 6. Venting of Bin 7 to Shredder 1/Grinder 2 (as shown in FIG. 1) additionally aids grinding therein. Moreover, venting of Bin 7 enables better control of pneumatic transport of materials through the system.

Impact of the pieces of Impact Mill 6 liberates metal from plastic. As can be understood, this liberation stage is an important feature. It has been found that centrifugal impacting at high speeds (e.g. over 2000 RPM such as 2500–3500 RPM) using intermeshing rotor and stator optimally accomplishes such liberation with particle sizes as previously mentioned. In addition to shattering the pieces of metallized plastic, pulverization of the plastic into a powder thus occurs. Preferably, at least about 80% by weight of the plastic passes through a 3 mesh screen, more preferably for, for example, chrom plated ABS a 8 mesh screen. Especially desireable liberation of metal occurs when at least about 80% e.g. 90% by weight of the plastic passes through a 12 mesh screen.

The powder (with at least substantially metal particles dispersed therein) then can be conveyed pneumatically to Magnetic Separator 7 that is fed by a vibratory feeder. Magnetic Separator 7 can be the same as Magnetic Separator 3 except preferably without added rubber roll. At this state the non-magnetic fraction pneumatically transferred from Magnetic Separator 7 should desirably have about 95% by weight or greater, e.g. 98% by weight of the metal removed. An exposure to a magnetic field in a range of between about 1000–2500 gauss is preferable for Magnetic Separator 7. If desired, the non-magnetic fraction from Magnetic Separator 7 may be transported directly to an extruder with appropriate screens (e.g. 20–60 mesh) to filter metal and provide reusable plastic, usually general purpose plastic. More preferably, however, the non-magnetic fraction is further fractionated as follows.

The non-magnetic fraction is pneumatically conveyed preferably to a vibratory feeder for Material Classifier 8. Material Classifier 8 collects the smallest particles from Separator 7. Material classifier 8 separates out larger particles e.g. larger than about 3, more preferably 10 to 20 mesh (normally less than 25% by weight of all particles, preferably less than 10% by weight). The large particles desirably are pneumatically conveyed back to Cryogenic Feeder 5 for reprocessing. The particles screened out by Material Classifier 8 for recycle are most preferably those on about a 12 mesh or greater screen. While Material Classifier 8 could be omitted, its use advantageously provides an ability to recycle larger particles, if present, that often contain higher amounts of metal rather than magnetically withdrawing them with consequent loss of plastic. Additionally, removal of larger particles facilitates later magnetic and other separations.

Magnetic Separators 9 provide a high intensity megnetic field through which the powder drops. Adjustment of the material splitters accomplishes removal of remaining magnetically susceptible materials. The splitters which are conventionally included with such separators, allow variance in the amount of powder separated magnetically. Magnetic Separators 9 reduce the amount of metal in the powder desirably to below 2% by weight and in preferred operation to less than 1% by weight, e.g., 0.8% by weight of the product.

The above described process permits preparation of general purpose thermoplastic polymer that may be used alone or, blended with other polymer, if desired to even further reduce relative amount of impurities. In operation of the preferred process of this invention, however, the non-magnetic fraction from Magnetic Separators 9 is passed to Extruder 10 wherein it is made molten and passed through one or more screens (e.g. 20–200 mesh). The screens continuously change and filter out residual impurities. After such filtration, the thermoplastic polymer may be used as plating grade thermoplastic, without further blending, if desired. The screening during extrusion may be omitted in whole or, in part to yield thermoplastic polymer suitable as general molding grade thermoplastic, especially if blended with other such material.

The following examples include an illustration of this invention in certain of its preferred aspects and are not intended as necessarily limiting its scope.

EXAMPLE 1

This example illustrated reclamation and rejuvenation of plastic from scrap consisting of chrome plated automotive grills, chrome plated headlamp housings, and other similar scrap. The process apparatus is in accordance with the FIG. 1. Equipment and its operation is as follows:

1. Shredder 1 is Model 3CAX-3048-V available from Blower Application Co. The Shredder operates at maximum RPM.
2. Grinder 2 is Model 2437 Series 5000 Granulator available from Entroleter Corporation. Grinder 2 operates at maximum RPM.
3. Magnetic Separator 3 is Model HFCC Permanent Magnetic Drum available from Eriez Magnetics. It has a 15×24 inch roll with one quarter inch rubber wrap. Magnetic Separator 3 operates at about 40 RPM.

4. Cryogenic Feeder 5 is Cryogrind Model 6C Screw Conveyor available from Air Products and Chemicals, Inc. Nitrogen weight feed rate averages between about 0.3–0.6 per weight of pieces conveyed. Temperature in Cryogenic Feeder 5 ranges between about −200° F. ±50° F. during continuous operation.

5. Impact Mill 6 is Series 30 Heavy Duty Adjustable Impact Mill utilizing a M3S2 Rotor design available from Entroleter Corporation. The mill has intermeshing rotor and stator pegs. The pegs are rectilinear of the following dimensions: Rotor—⅛″ L. by ½″ W. by 1⅛″ H; Stator—¼″ L. by ½″ W. by 1½″ H. The pegs are arranged so that two opposing corners or each peg lie on a straight line drawn through the center of the mill. (For further information on mills as Impact Mill 6, reference may be made to Centrimill Bulletin CM-100/2 of Entoleter Corporation). Impact Mill 6 operates at 3000 RPM.

6. Magnetic Separator 7 is a model like Magnetic Separator 3 except it does not have rubber wrap. Magnetic Separator 7 operates at 40 RPM.

7. Material Classifier is Model C-362-V-36″ diameter available from Eriez Magnetics. Material Classifier 8 operates such that particles that retained on a 12 mesh screen return to Cryogrind Feeder 5.

8. Magnetic Separators 9 are 800–1200 watt induced Magnetic Roll Separators available from Eriez Magnetics.

9. Extruder 10 is a six inch single screw extruder with continuous screen changer. The screen continuously passes through the extruding polymer. Cooling at the periphery allows the polymer to act as a seal. The screen retains sufficient heat, however, to slide through the extrudding polymer. The screens are 20 and 60 mesh.

10. The venturis are models available from Process Control Corporation with adjustable throat. Each uses a centrifugal fan source. As seen by the drawing, a cyclone at the discharge separates material from an air stream which is ducted back to close the system.

11. Vibrator Feeders are models available from Eriez Magnetics.

The chrome plated scrap comprises about 15 parts by weight metal for each 100 parts by weight ABS. The chrome plate comprises strike nickel (one tenth of a mil); copper (7 tenths of a mil); semi-bright nickel (5 tenths of a mil); bright nickel (3 tenths of a mil); and chromium (one hundredth of a mil). The ABS grills and other pieces are chrome plated in an automotive automated chrome plating operation and constitute scrap. The scrap weights vary mostly from 0.2 to 3 kg.

The system is electrically connected to operate automatically. It is self purging. The system is turned on with following sequence. Nitrogen exhaust fan starts for ventialtion. The nitrogen start is activated manually. This energized nitrogen supply solenoids and temperature controllers. This allows nitrogen to be fed to Cryogenic Feeder 5 solenoids. Cryogenic Feeder 5 and Impact Mill 6 solenoids are activated allowing nitrogen to enter Cryogenic Feeder 5. Ready light comes on when temperature drops below 100° F. The automated sequence button is turned on manually after activation of ready light. This energized all rotary bin level switches, bin level lights, impact mill oil mist, heater for Impact Mill 6 starter and Impact Mill 6 starter motor. The starter motor energizes Magnetic Separators 9. After 30 second delay vibratory feeder to Separator 9 starts along with the blower below Bin 10. This starts Material Classifier 8. After 10 second delay, the vibratory feeder to Classifier 8 starts. This starts the blower below Bin 4. This starts Magnetic Separator 7. This starts the fan below Bin 7. This starts Cryofeeder 5 control start and the blower below Bin 9. This starts the blower below Bin 4. This starts the blower below Bin 3. This starts Magnetic Separator 3. This starts the blower below Grinder 2. This starts Shredder 1 and Grinder 2. This starts after 90 seconds conveyance of scrap to system. Material flow into Shredder 1 is at between about 900–1000 kg/hr.

Figure 2:
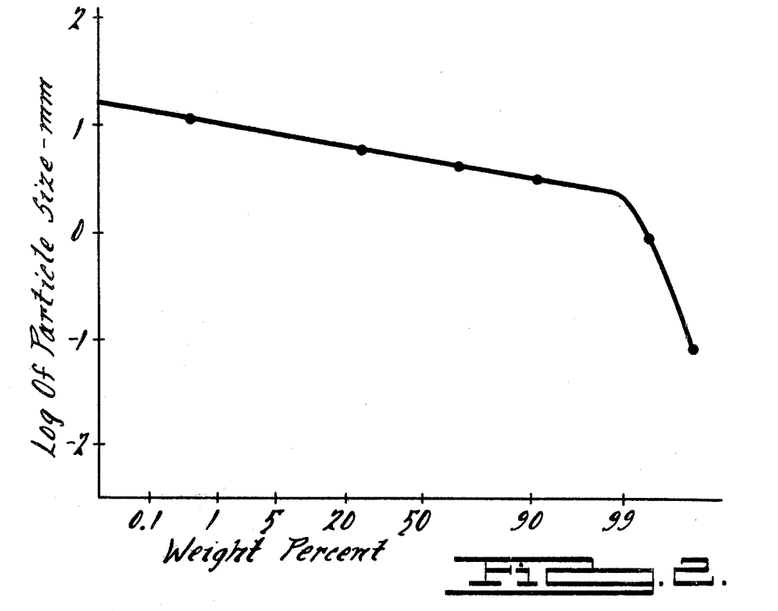

Particle samples are taken from various stages in the process after continuous operation. Sieve analysis shows:

1. The silo has particles that have an average particle size of about 5 mm. (i.e. 50% by weight would pass through a 5 mm mesh screen). 80% by weight of the particles are between 3–8 mm. FIG. 2 shows their particle distribution as weight percent against log of particle size.

Figure 3:
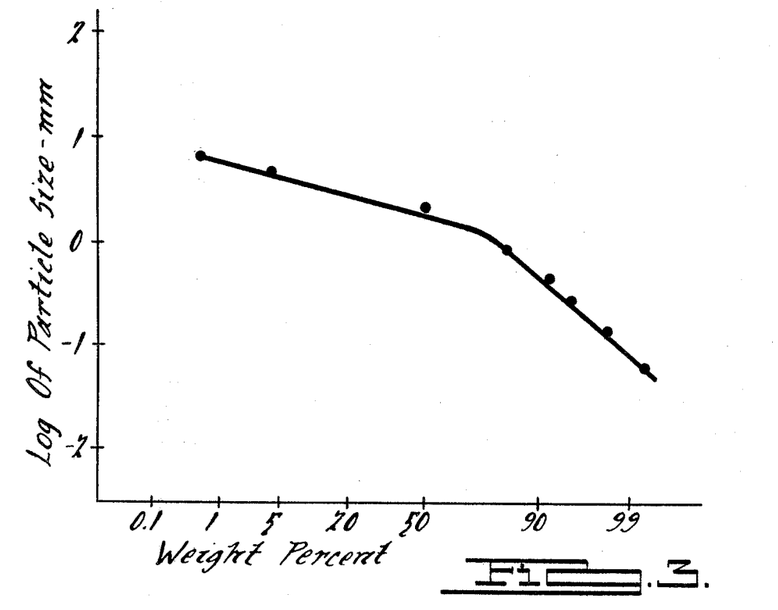

2. Magnetic Separators 7 draw off metal particles to have an average particle size of about 1.8 millimeters. (i.e. half by weight would pass through a screen with 1.8 millimeter opening). About 90% by weight are less than about 3.5 millimeters. Since the metal particles are not spherical and, moreover, easily deformed, the above are approximations. FIG. 3 shows their particle distribution as weight percent against log of particle size.

Figure 4:
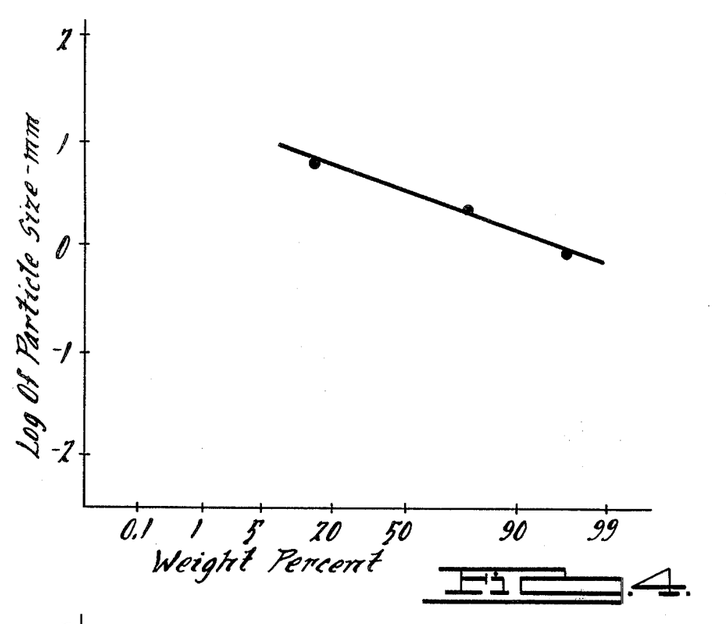

3. Particles returned by Material Classifier 8 have an average size of about 3.2 millimeters. 90% are larger than 1.2 millimeters. FIG. 4 shows their particle size distribution as weight present against particle size.

Figure 5:
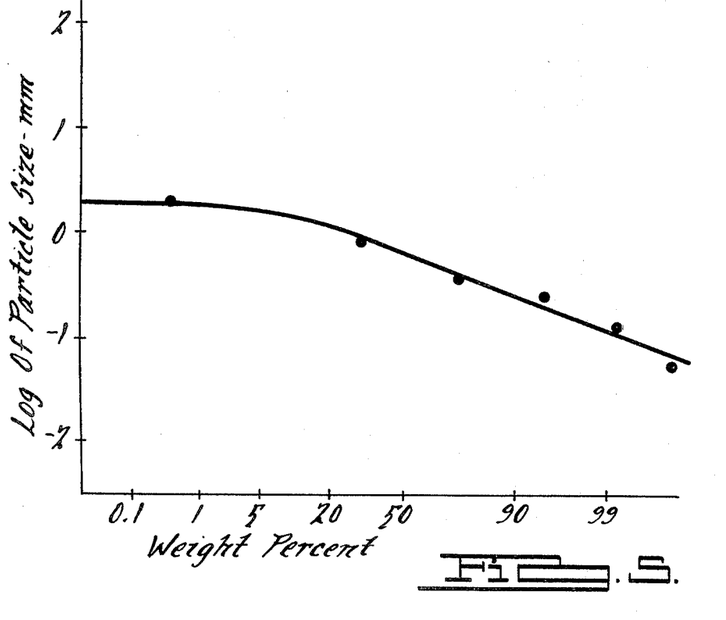
Figure 8:
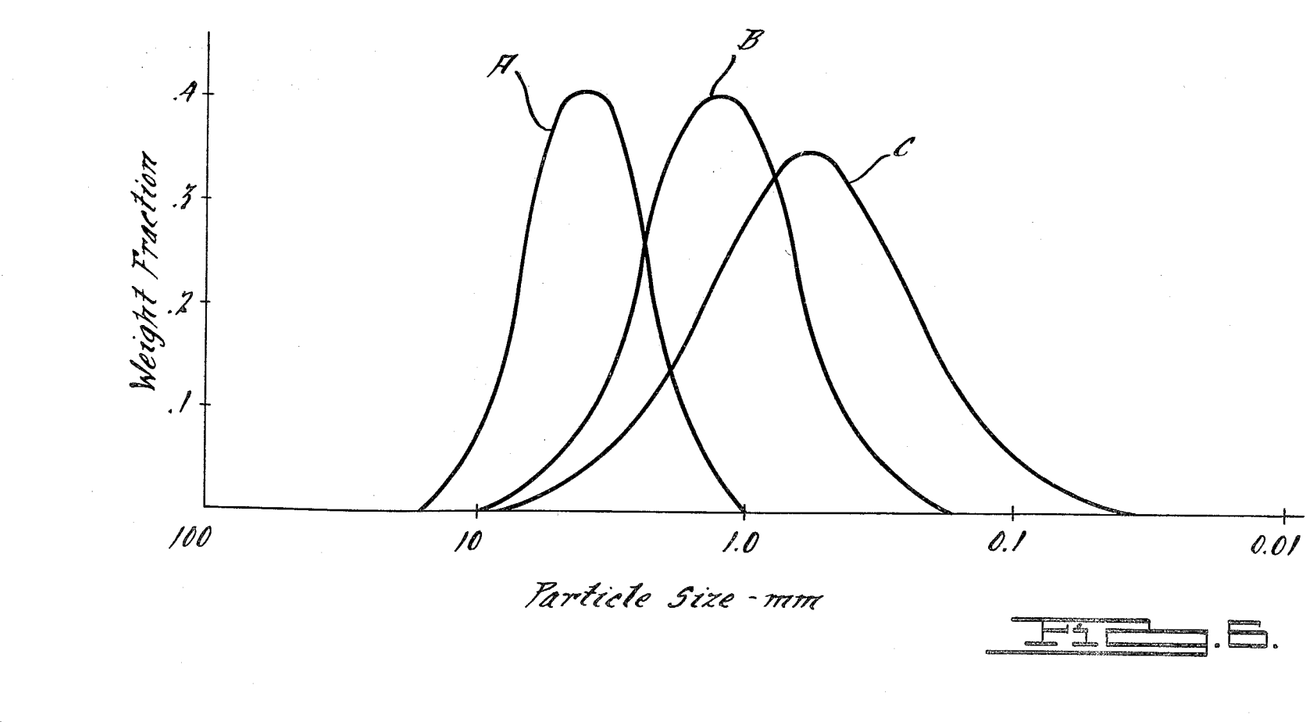

4. the non-magnetic fraction from Magnetic Separators 9 have an average particle size of about 0.6 millimeters. 90% by weight passes through a 16 mesh screen. FIG. 5 shows their particle size distribution as weight percent against log of particle size. FIG. 6 shows an approximation of particle size versus weight fraction for (1) metallized plastic before Impact Mill 6 (curve A); (2) metal after Impact Mill 6 (curve B); and (3) ABS after Impact Mill 6 (curve C).

Analysis by a sample from the non-magnetic fraction from Magnetic Separators 9 yields by weight in one case 0.85% ±0.1% metal; in another case 1.05% ±0.1% metal. After extrusion through continuous screen changer of Extruder 10, results show 0.4% ±0.1% metal by weight.

Samples of ABS extrudate from Extruder 10 exhibit properties shown in Table 1.

TABLE 1

| | | |
|---|---|---|
| A. | Specific Gravity (ASTM-D-792) | 1.06 |
| B. | Tensile Strength 0.2″/min. (ASTM-D-638) | 42.7 MPa |
| C. | Flexural Strength 0.05″/min. Span 2″; ⅛″ bar (ASTM-D-790) | 77.9 MPa |
| D. | Flexural Modulus 0.05″/min. Span 2″; ⅛″ bar (ASTM-D-790) | 2715.2 MPa |
| E. | Notched izod Impact ⅛″ bar (ASTM-D-256) | 0.112 J/mm |
| F. | Deflection Temperature (ASTM-D-648) | |
| | at 66 psi as rec. | 96° C. |
| | at 264 psi as rec. | 90° C. |
| G. | Rockwell "R" Hardness (ASTM-D-785) | 111 |
| H. | Modulus Elasticity in Tension | 2321.4 MPa |
| I. | Ash by weight | 1.5% |

Other samples are molded and plated to yield new chrome plated grills. The new chrome plated grills exhibit acceptable properties for use as automotive chrome plated grills.

EXAMPLE 2

The procedures of Example 1 are followed except the temperatures in Cryogenic Feeder 5 is −175° F. ±50° F. Results are deemed similar.

EXAMPLE 3

The procedures of Example 2 are followed except that the pieces entering Cryogenic Feeder 5 are slightly larger on the average, i.e. about 50% by weight would pass through a 7 mm screen. Results are deemed to be desirable.

EXAMPLE 4

The procedures of Example 1 are followed except that samples are taken before extrusion through Extruder 10. The samples are blended and conventionally extruded with 50% by weight ABS of general purpose character to form pellets. Properties of samples molded from the pellets are acceptable for reuse of the blend as general purpose ABS.

EXAMPLE 5

The procedures of Example 2 are followed except that chrome plated Noryl thermoplastic replace the chrome plated ABS. Results are deemed to be desirable.

EXAMPLE 6

The procedures of Example 1 are followed except that chrome plated polypropylene replace the pieces of the chrome plated ABS. Results are deemed to be desirable.

What is claimed is:

1. A method of reclamation of plating grade plastic from metallized plastic wherein the plastic has a tenaciously adherent coating of essentially nonferrous metal comprising a layer that is magnetically susceptible, which method comprises:
   (a) exposing pieces of said metallized plastic to a cryogenic temperature to embrittle same;
   (b) impacting the cooled pieces in a rotary impact mill to form a plastic and metal dispersion;
   (c) withdrawing from said dispersion an amount of said metal to provide a reusable plastic by effecting particle size separation, comprising segregating an intermediate product that will pass through a 12-20 mesh screen, and by exposing said intermediate product to a high intensity electromagnetic separation; and
   (d) filtering out residual impurities from the nonmagnetic fraction of step (c) by passing same through an extruder with continuous screen changer.

2. A method in accordance with claim 1, wherein said plastic comprises thermoplastic.

3. A method in accordance with claim 1, wherein said reusable plastic comprises about one percent by weight metal or less.

4. A method in accordance with claim 1 or 2 or 3, wherein said coating comprises a nonferromagnetic metal.

5. A method in accordance with claim 1, wherein said plastic comprises ABS.

6. A method in accordance with claim 1, wherein said cooled pieces are impacted against rectilinear impacting pegs in a rotary impact mill.

7. A method in accordance with claim 1, wherein said pieces in step (a) comprise comminuted pieces of chrome plated ABS scrap that have undergone a magnetic separation.

8. A method in accordance with claim 5 or 6 or 7, wherein said dispersion comprises a plastic powder at least about 80% by weight of which has a weight average between largest and smallest particle dimension at least about ten times less than that of said pieces in step (a).

9. A method in accordance with claim 8, wherein at least about 90% by weight of the plastic of said dispersion will pass through a 12 mesh screen.

10. A method in accordance with claim 1, wherein said coating comprises nickel, copper and chrome.

11. A method in accordance with claim 1, wherein said temperature is below about −125° C.

12. A method in accordance with claim 1, wherein said temperature is below about −157° C.

13. A method in accordance with claim 1, wherein said dispersion is subjected to an additional magnetic removal step subsequent to step (b) and prior to the particle size separation of step (c).

14. A plastic product recovered from the method of claim 1.

15. A metal product recovered from the method of claim 1.

16. A method of reclamation of plating grade plastic from metallized plastic wherein the plastic has a tenaciously adherent coating of essentially nonferrous metal comprising a layer that is magnetically susceptable, which method comprises:
   (a) providing particulate metallized plastic having a weight average between largest and smallest particle dimension of between about 1-20 millimeters;
   (b) exposing said particulate metallized plastic to a cryogenic temperature to embrittle same;
   (c) impacting the cooled pieces in a rotary impact mill to form a plastic and metal dispersion at least about 80% by weight of which has a weight average average between smallest and largest particle dimensions that is at least about ten times smaller than that of the metallized plastic provided in step (a); and
   (d) withdrawing from said dispersion an amount of said metal sufficient to provide a reusable plating grade plastic by
      (i) removing particles larger than about 12 to 20 mesh; and
      (ii) then magnetically removing metal particles by subjecting product of step (d)(i) to a high intensity electromagnetic separation; and
   (e) filtering out residual impurities from the nonmagnetic fraction of step (d) by passing same through an extruder with continuous screen changer.

17. A method in accordance with claim 16, wherein said plastic comprises thermoplastic.

18. A method in accordance with claim 16, wherein said reusable plastic comprises about one percent by weight metal or less.

19. A method in accordance with claim 16, 17 or 18, wherein said coating comprises a nonferromagnetic metal.

20. A method in accordance with claim 16, wherein said plastic comprises ABS.

21. A method in accordance with claim 16, wherein said cooled metallized plastic is impacted against rectilinear impacting pegs in a rotary impact mill.

22. A method in accordance with claim 16, wherein said particulate metallized plastic in step (c) comprises comminuted pieces of chrome plated ABS scrap that have undergone a magnetic separation between step (a) and step (b).

23. A method in accordance with claim 20, 21 or 22, wherein at least about 90% by weight of the plastic of said dispersion will pass through a 12 mesh screen.

24. A method in accordance with claim 23, wherein said coating comprises nickel, copper and chrome.

25. A method in accordance with claim 16, wherein said temperature is below about $-125°$ C.

26. A method in accordance with claim 16, wherein said temperature is below about $-157°$ C.

27. A plastic product recovered from the method of claim 16.

28. A metal product recovered from the method of claim 16.

29. A method of reclamation of plating grade plastic from metallized plastic wherein the plastic has a tenaciously adherent coating of essentially nonferrous metal comprising a layer that is magnetically susceptable, which method comprises:
(a) exposing pieces of said metallized plastic to a cryogenic temperature to embrittle same;
(b) impacting the cooled pieces in a rotary impact mill to form a plastic and metal dispersion;
(c) withdrawing from said dispersion an amount of said metal to provide a reusable plastic by effecting particle size separation, comprising segregating an intermediate product that will pass through a 12-20 mesh screen, and by exposing said intermediate product to magnetic separation; and
(d) filtering out residual impurities from the nonmagnetic fraction of step (c) by passing same through an extruder with continuous screen changer.

30. A method in accordance with claim 29, wherein said plastic comprises thermoplastic.

31. A method in accordance with claim 29, wherein said reusable plastic comprises about one percent by weight metal or less.

32. A method in accordance with claim 29, wherein said coating comprises a nonferromagnetic metal.

33. A method in accordance with claim 29, wherein said plastic comprises ABS.

34. A method in accordance with claim 29, wherein said cooled pieces are impacted against rectilinear impacting pegs in a rotary impact mill.

35. A method in accordance with claim 29, wherein said pieces in step (a) comprise comminuted pieces of chrome plated ABS scrap that have undergone a magnetic separation.

36. A method in accordance with claim 29, wherein said dispersion comprises a plastic powder at least about 80% by weight of which has a weight average between largest and smallest particle dimension at least about ten times less than that of said pieces in step (a).

37. A method in accordance with claim 36, wherein at least about 90% by weight of the plastic of said dispersion will pass through a 12 screen.

38. A method in accordance with claim 29, wherein said coating comprises nickel, copper and chrome.

39. A method in accordance with claim 29, wherein said temperature is below about $-125°$ C.

40. A method in accordance with claim 29, wherein said temperature is below about $-157°$ C.

41. A method in accordance with claim 29, wherein said dispersion is subjected to an additional magnetic removal step subsequent to step (b) and prior to the particle size separation of step (c).

42. A plastic product recovered from the method of claim 29.

43. A metal product recovered from the method of claim 29.

44. A method of reclamation of plating grade plastic from metallized plastic wherein the plastic has a tenaciously adherent coating of essentially nonferrous metal comprising a layer that is magnetically susceptable, which method comprises:
(a) providing particulate metallized plastic having a weight average average between largest and smallest particle dimension of between about 1-20 millimeters;
(b) exposing said particulate metallized plastic to a cryogenic temperature to embrittle same;
(c) impacting the cooled pieces in a rotary impact mill to form a plastic and metal dispersion at least about 80% by weight of which has a weight average average between smallest and largest particle dimensions that is at least about ten times smaller than that of the metallized plastic provided in step (a); and
(d) withdrawing from said dispersion an amount of said metal sufficient to provide a reusable plating grade plastic by
(i) removing particles larger than about 12 to 20 mesh; and
(ii) then subjecting the product of step (d)(i) to magnetic separation to magnetically remove metal particles; and
(e) filtering out residual impurities from the nonmagnetic fraction of step (d) by passing same through an extruder with continuous screen changer.

45. A method in accordance with claim 44, wherein said plastic comprises thermoplastic.

46. A method in accordance with claim 44, wherein said reusable plastic comprises about one percent by weight metal or less.

47. A method in accordance with claim 44, wherein said coating comprises a nonferromagnetic metal.

48. A method in accordance with claim 44, wherein said plastic comprises ABS.

49. A method in accordance with claim 44, wherein said cooled metallized plastic is impacted against rectilinear impacting pegs in a rotary impact mill.

50. A method in accordance with claim 44, wherein said particulate metallized plastic in step (c) comprises comminuted pieces of chrome plated ABS scrap that have undergone a magnetic separation between step (a) and step (b).

51. A method in accordance with claim 44, wherein at least about 90% by weight of the plastic of said dispersion will pass through a 12 mesh screen.

52. A method in accordance with claim 51, wherein said coating comprises nickel, copper and chrome.

53. A method in accordance with claim 44, wherein said temperature is below about $-125°$ C.

54. A method in accordance with claim 44, wherein said temperature is below about $-157°$ C.

55. A plastic product recovered from the method of claim 44.

56. A metal product recovered from the method of claim 44.

* * * * *